(12) United States Patent
Subat et al.

(10) Patent No.: US 9,930,433 B2
(45) Date of Patent: *Mar. 27, 2018

(54) EXTERNAL ATTACHMENTS FOR SPEAKERS IN SEATS

(71) Applicant: Bose Corporation, Framingham, MA (US)

(72) Inventors: Bradford Kyle Subat, Worcester, MA (US); Charles Oswald, Arlington, MA (US); Tobe Z. Barksdale, Bolton, MA (US); David Meeker, Acton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/197,079

(22) Filed: Jun. 29, 2016

(65) Prior Publication Data
US 2016/0381445 A1    Dec. 29, 2016

Related U.S. Application Data

(63) Continuation of application No. 14/543,704, filed on Nov. 17, 2014, now Pat. No. 9,403,454.

(51) Int. Cl.
*H04R 1/02* (2006.01)
*B60N 2/44* (2006.01)
(Continued)

(52) U.S. Cl.
CPC ............ *H04R 1/025* (2013.01); *B60N 2/44* (2013.01); *B60N 2/4876* (2013.01);
(Continued)

(58) Field of Classification Search
CPC .......... H04R 1/02; H04R 1/023; H04R 1/025; H04R 1/026; H04R 1/086; H04R 5/02;
(Continued)

(56) References Cited

U.S. PATENT DOCUMENTS

| 4,042,791 | A | * | 8/1977 | Wiseman | B60N 2/4876 181/141 |
| 4,490,842 | A | * | 12/1984 | Watanabe | B60N 2/4876 181/156 |
| 4,638,884 | A | | 1/1987 | Lee | |
| 4,696,370 | A | | 9/1987 | Tokumo et al. | |
| 4,974,698 | A | | 12/1990 | Smith | |
| 2010/0282536 | A1 | | 11/2010 | Carps | |
| 2014/0270322 | A1 | | 9/2014 | Silverstein | |

(Continued)

FOREIGN PATENT DOCUMENTS

| JP | 61-082712 | 4/1986 |
| JP | 02-119840 | 9/1990 |
| JP | 2008-188099 | 8/2008 |

OTHER PUBLICATIONS

U.S. Appl. No. 14/154,924, filed Jan. 14, 2014, Charles Oswald et al.

(Continued)

*Primary Examiner* — Huyen D Le
(74) *Attorney, Agent, or Firm* — Fish & Richardson P.C.

(57) ABSTRACT

The technology described in this document is embodied in a speaker grill configured to be attached to a speaker system disposed in a portion of a vehicle seat. The speaker grill includes a base that includes perforations to allow acoustic energy from the speakers to pass through the grill, a sidewall extending from the base such that the sidewall and the base define a cavity, and a structural feature configured to allow the speaker grill to be to be attached to a substantially rigid portion of the vehicle seat. The speaker grill is attached in an acoustic path of the speaker system, and is removable from the substantially rigid portion of the vehicle seat following attachment.

19 Claims, 13 Drawing Sheets

(51) Int. Cl.
*B60R 11/02* (2006.01)
*H04R 5/02* (2006.01)
*H04R 1/08* (2006.01)
*B60N 2/48* (2006.01)
*H04R 1/32* (2006.01)
*B60R 11/00* (2006.01)

(52) U.S. Cl.
CPC .......... *B60R 11/0217* (2013.01); *H04R 1/023* (2013.01); *H04R 1/026* (2013.01); *H04R 1/086* (2013.01); *H04R 1/323* (2013.01); *H04R 5/02* (2013.01); *H04R 5/023* (2013.01); *B60R 2011/0017* (2013.01); *H04R 2499/13* (2013.01)

(58) Field of Classification Search
CPC .............. H04R 5/023; H04R 2201/021; H04R 2499/13; H04R 1/323; B60R 11/0217; B60N 2/4876
USPC ......... 381/300, 301, 302, 86, 338, 353, 354, 381/386, 388, 389, 391, 189, 87, 333; 181/141, 150, 156, 199
See application file for complete search history.

(56) References Cited

U.S. PATENT DOCUMENTS

2014/0311818 A1   10/2014   Audi et al.
2014/0355783 A1   12/2014   Subat

OTHER PUBLICATIONS

International Search Report and Written Opinion; PCT/US2015/060784; dated Feb. 8, 2016; 10 pp.
Notice of Reasons for Rejection; JP Appln. No. 2017-526541; dated Dec. 11, 2017; 24 pages.

* cited by examiner

EXTERNAL ATTACHMENTS FOR SPEAKERS IN SEATS

CROSS REFERENCE TO RELATED APLICATIONS

This application is a continuation of and claims benefit to U.S. application Ser. No. 14/543,704, filed on Nov. 17, 2014, which is incorporated herein by reference in its entirety.

TECHNICAL FIELD

This disclosure generally relates to seats that include acoustic output devices such as speakers.

BACKGROUND

Headrests used in vehicle seats can include speakers to deliver a near-field acoustic experience.

SUMMARY

In one aspect, this document features a speaker grill configured to be attached to a speaker system disposed in a portion of a vehicle seat. The speaker grill includes a base that includes perforations to allow acoustic energy from the speakers to pass through the grill, a sidewall extending from the base such that the sidewall and the base define a cavity, and a structural feature configured to allow the speaker grill to be to be attached to a substantially rigid portion of the vehicle seat. The speaker grill is attached in an acoustic path of the speaker system, and is removable from the substantially rigid portion of the vehicle seat following attachment.

In another aspect, this document features a seat headrest that includes a housing arranged to support at least a portion of the head of a user. The housing includes at least one speaker, an opening in an external surface of the housing, and a cavity configured to accommodate an acoustic channel between the speaker and the opening. The seat headrest also includes an external speaker grill configured to be attached to the housing at the opening. The speaker grill includes a base that includes perforations to allow acoustic energy from the speakers to pass through the grill, a sidewall that extends from the base, and a structural feature that is configured to allow the speaker grill to be to be attached to a substantially rigid portion of the housing. The grill is attached in an acoustic path of the speaker system, and can be removable from the substantially rigid portion of the housing following attachment.

Implementations of the above aspects can include one or more of the following features.

The sidewall can be curved such that the sidewall forms a beveled edge.

At least a portion of the beveled edge can be configured to overlap an external layer of the vehicle seat when the grill is attached to the substantially rigid portion. The substantially rigid portion can be made of a material such as expanded resin, metal, or plastic. The substantially rigid portion can include a connector disposed in an acoustic channel of the speaker system. The connector can be attached to an acoustic enclosure of the speaker system. The substantially rigid portion can include a frame of the seat. The portion of the vehicle seat can include a headrest. The structural feature can be disposed on the sidewall. The structural feature can include a recessed portion configured to attach in a mating configuration with a projected portion in the substantially rigid portion of the vehicle seat. The structural feature can include a projected portion configured to attach in a mating configuration with a recessed portion in the substantially rigid portion of the vehicle seat. A portion of the base can overlap with an external layer of the vehicle seat when the grill is attached to the substantially rigid portion.

The substantially rigid portion can include a first frame portion disposed on one side of the housing, and a second frame portion disposed on another, opposing side of the housing. The substantially rigid portion can include an acoustic channel disposed in the housing. A portion of the sidewall can overlap with an external layer of the headrest when the grill is attached to the substantially rigid portion of the housing.

Various implementations described herein may provide one or more of the following advantages. By providing an attachment that couples to a rigid support rather than non-rigid support such as fabric or soft foam, appearance of an acoustically enabled seat or headrest can be improved. The attachment can be configured to hold the seat fabric or leather in a tight configuration thereby reducing sagging of the fabric or leather. An external portion of the attachment can be made removable, thereby allowing for color and/or appearance customization. By coupling to a rigid support that is aligned to an acoustic channel, the alignment between the attachment and the acoustic channel can be improved.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

Vehicle seats can be fitted with acoustic transducers or speakers for delivering a near-field acoustic experience. For example, speakers can be fitted into seats such that the speakers are proximate to the ears of an occupant of the seat, to provide an immersive, and potentially personalized acoustic experience. The speakers can be disposed, for example, in a headrest of the seat, or in a portion of the seat near the occupant's neck or shoulders. When multiple speakers are used, the speakers may also be distributed in various parts of the seat, for example, to provide an immersive acoustic effect. This document primarily uses examples of seat headrests to illustrate the technology. However, the technology is also applicable to speakers disposed in other portions of a seat. In addition, while the examples below refer to vehicle seats, other types of acoustically enabled seats or furniture that may have speakers installed in the manner described herein. For example, the technology can be used in massage chairs, sofas, recliners, tables, or beds fitted with speakers.

Figure 1A:
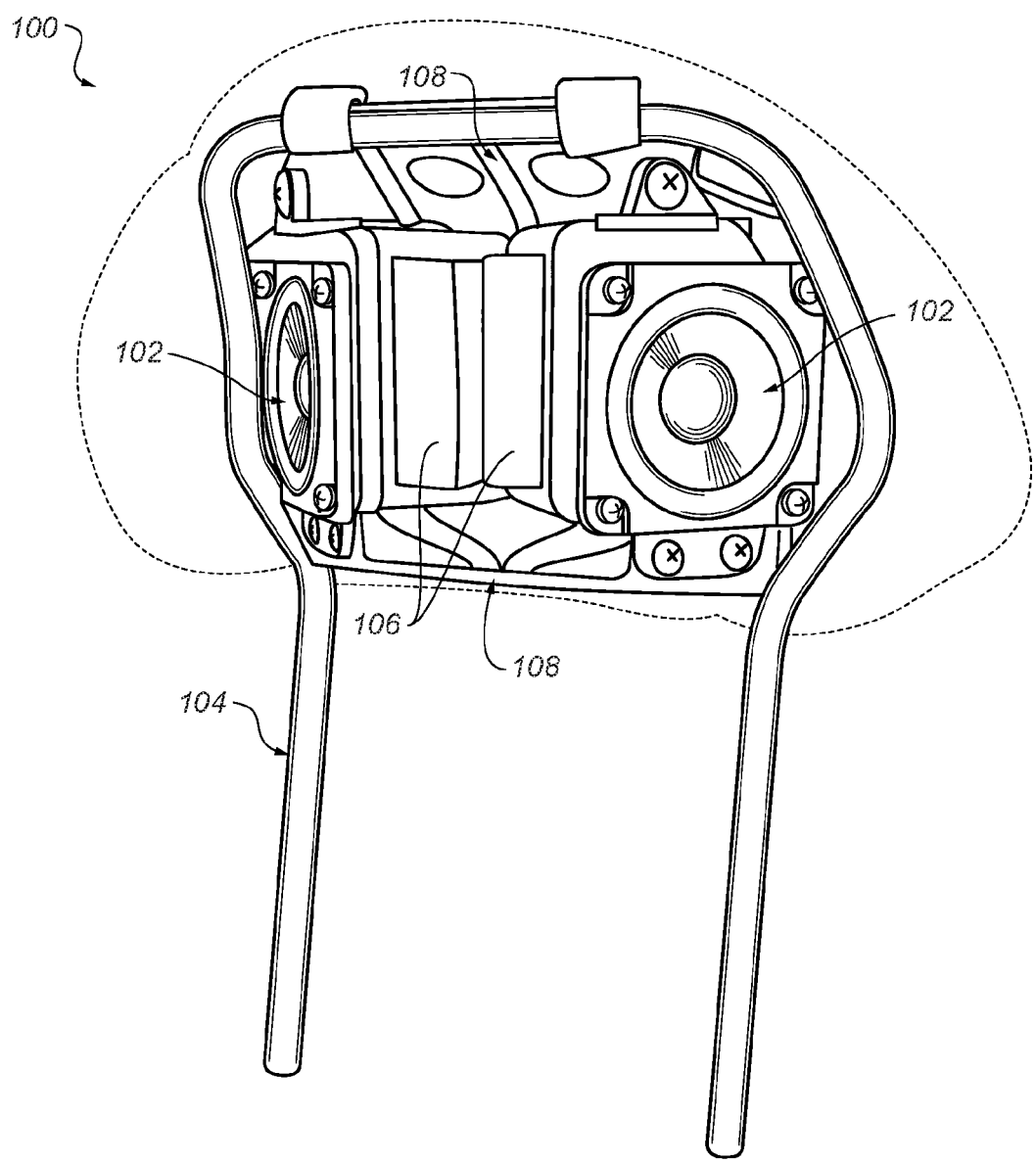
FIGS. 1A and 1B show perspective views of an inner portion of a headrest that includes speakers.
Figure 1B:
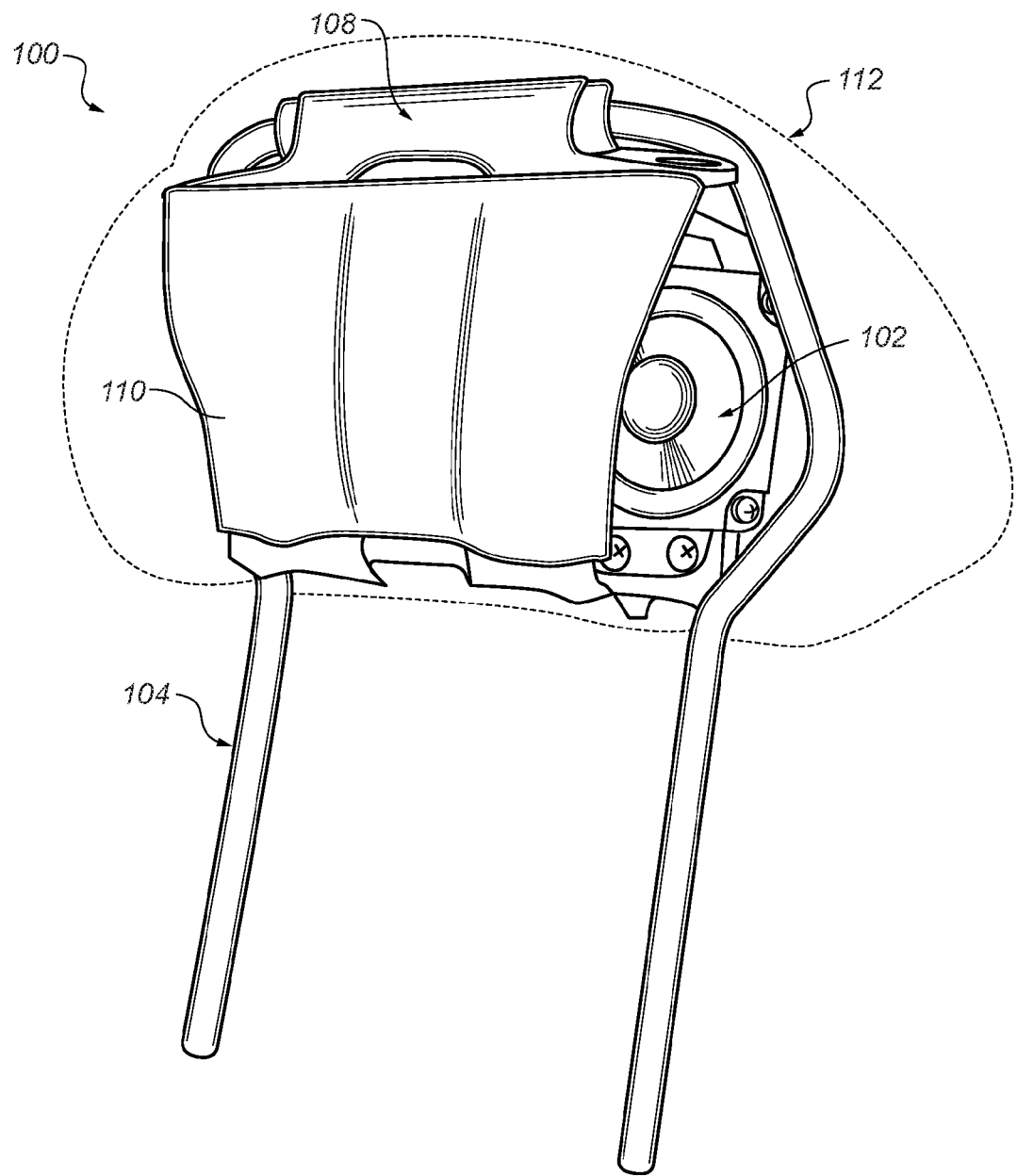

FIGS. 1A and 1B illustrate an example of a headrest 100 that incorporates speakers 102. Referring to FIG. 1A, the speakers 102 are attached to a U-shaped support rod 104 and are positioned such that the speakers 102 are directly behind the user's head (i.e., as opposed to the being located on the left and right sides of the U-shaped support rod 104) and to fire outwardly, in diverging directions on either side of the headrest 100.

Figure 1C:
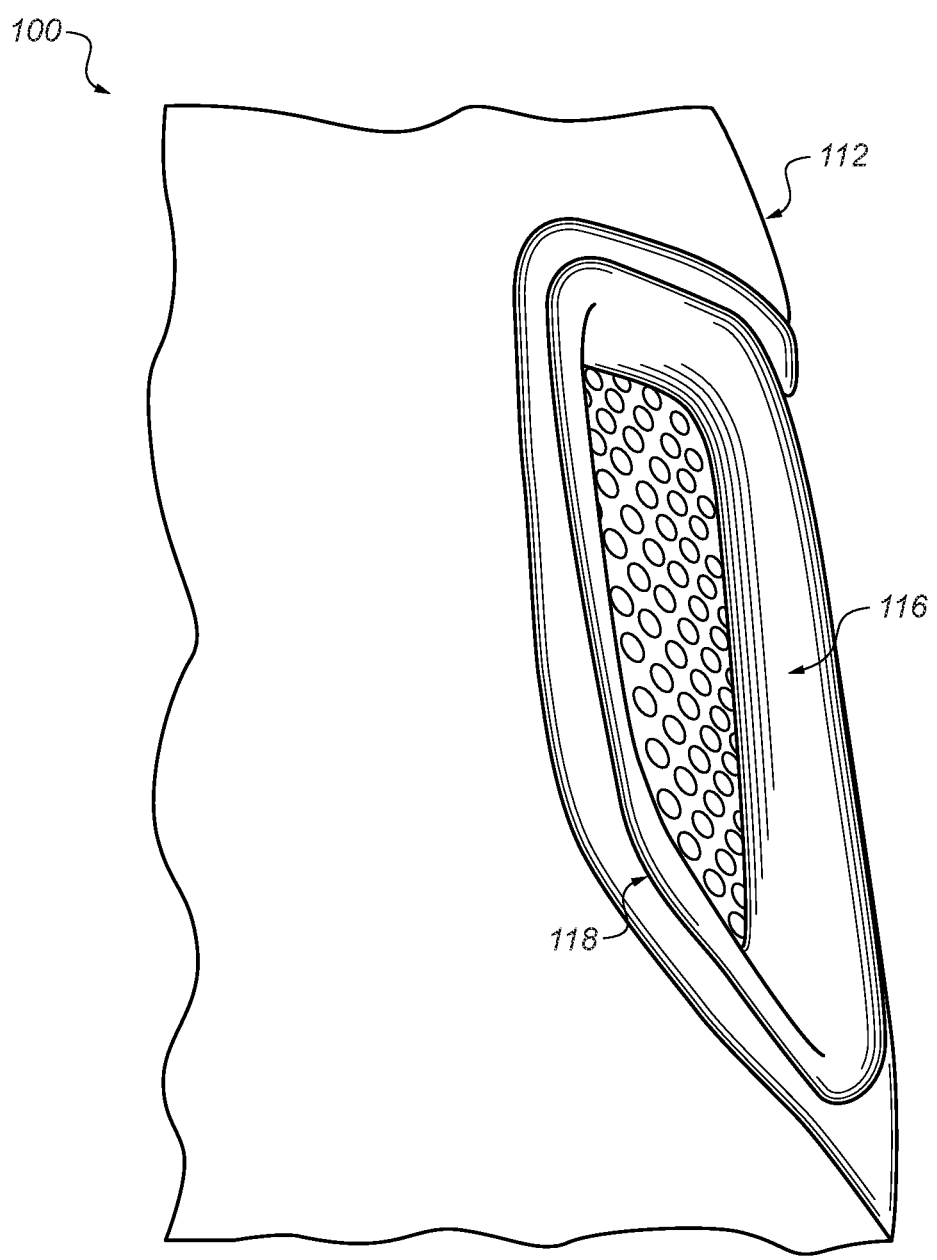
FIG. 1C shows a grill attachment coupled to an outer layer of the headrest.

In some cases, a small plastic enclosure 106 is attached to each speaker 102 for forming an acoustic enclosure. Each of those sub-assemblies then gets screwed into a two-piece sheet metal cage 108 which is secured to the U-shaped support rod 104. FIG. 1A shows a partial assembly with a front portion of the sheet metal cage 108 removed to view the speakers 102 and enclosures 106. FIG. 1B shows the sheet metal cage 108 fully assembled with the front portion 110 in place. A molded piece of foam cushioning is placed around that assembly, which is subsequently covered with a cover material 112 (e.g., fabric or leather). Each of the openings through which acoustic energy from a speaker 102 is radiated out can be covered using a grill 116, as shown in FIG. 1C. The grill 116 can protect the corresponding speaker 102, and assist in directing the radiation of acoustic energy toward the front of the headrest 100. The grill 116 can be disposed on either side of the headrest 100, or elsewhere depending on the location of the acoustic channel opening.

Attaching the grill 116 to the cover material 112 or to the underlying soft foam can have disadvantages. For example, the mechanical stability of the grill 116 can be reduced when the layer to which the grill is attached is non-rigid. In some cases, a gap (for example, the gap 118 shown in FIG. 1C) may form between the grill 116 and the underlying non-rigid material, thereby reducing a cosmetic appealing of the headrest 100.

Figure 2B:
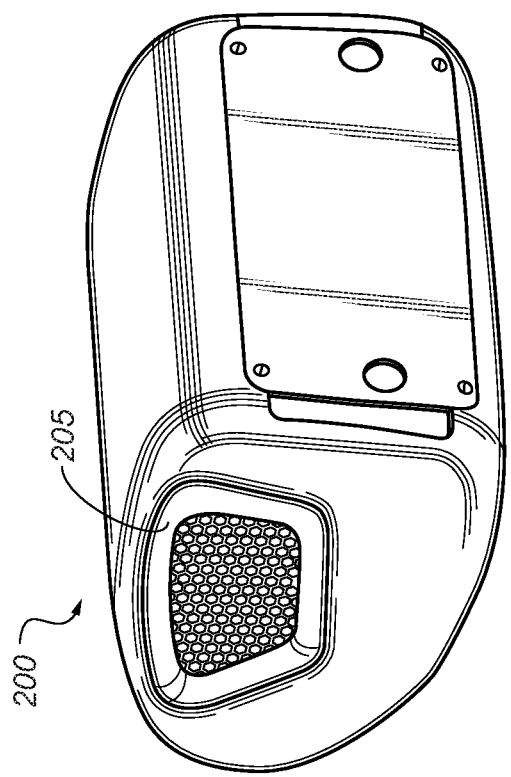
FIGS. 2A and 2B show a side perspective view and a bottom perspective view, respectively, of an example of a headrest in which a grill is attached to a rigid support.
Figure 2A:
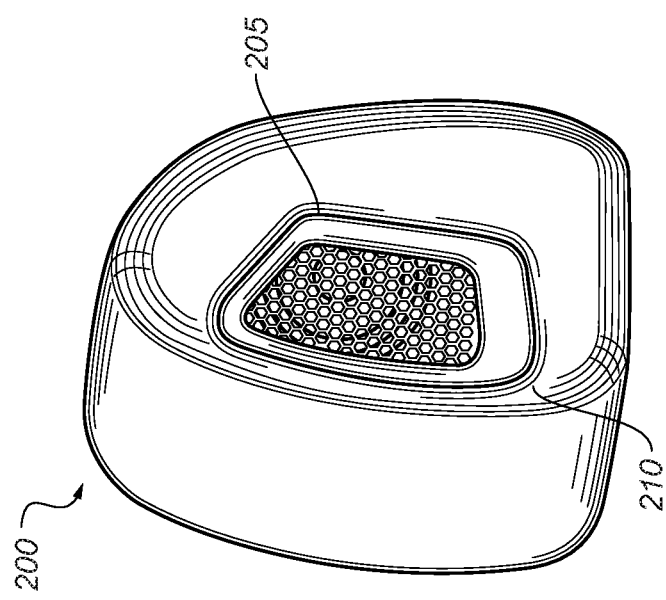

By attaching the speaker grill to a rigid support, the mechanical stability of the grill and the cosmetic appearance can be improved. FIGS. 2A and 2B show a side perspective view and a bottom perspective view, respectively, of an example of a headrest 200 in which a grill 205 is attached to a rigid support. In some implementations, the grill 205 is attached over an opening in the headrest 200 such that the external layer 210 (e.g., fabric or leather) of the headrest 200 is tightly drawn around the periphery of the grill 205. This improves the cosmetic appearance of the headrest 200 and provides increased mechanical stability to the grill. In some implementations, the grill 205 can be removably attached to a rigid support within the headrest 200. Such a removable attachment allows for customization and personalization, for example, with respect to the color of the grill 205, and/or a pattern of the perforations in the grill 205. Attaching the grill 205 to a rigid support may also facilitate an accurate alignment with an acoustic path disposed between the speaker and the opening in the headrest 200.

Figure 3A:
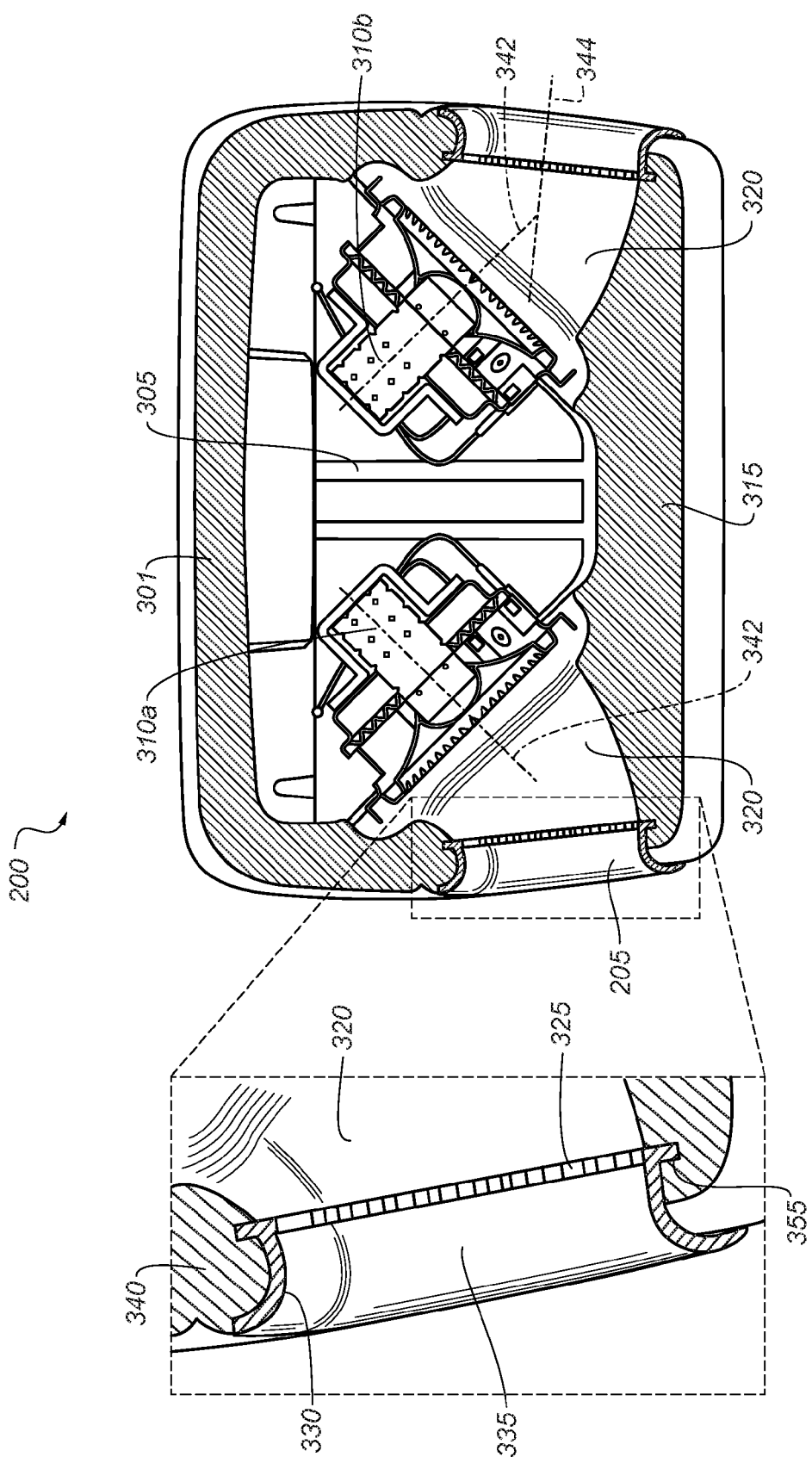
FIG. 3A shows a cross section of the headrest of FIGS. 2A and 2B.
Figure 3B:
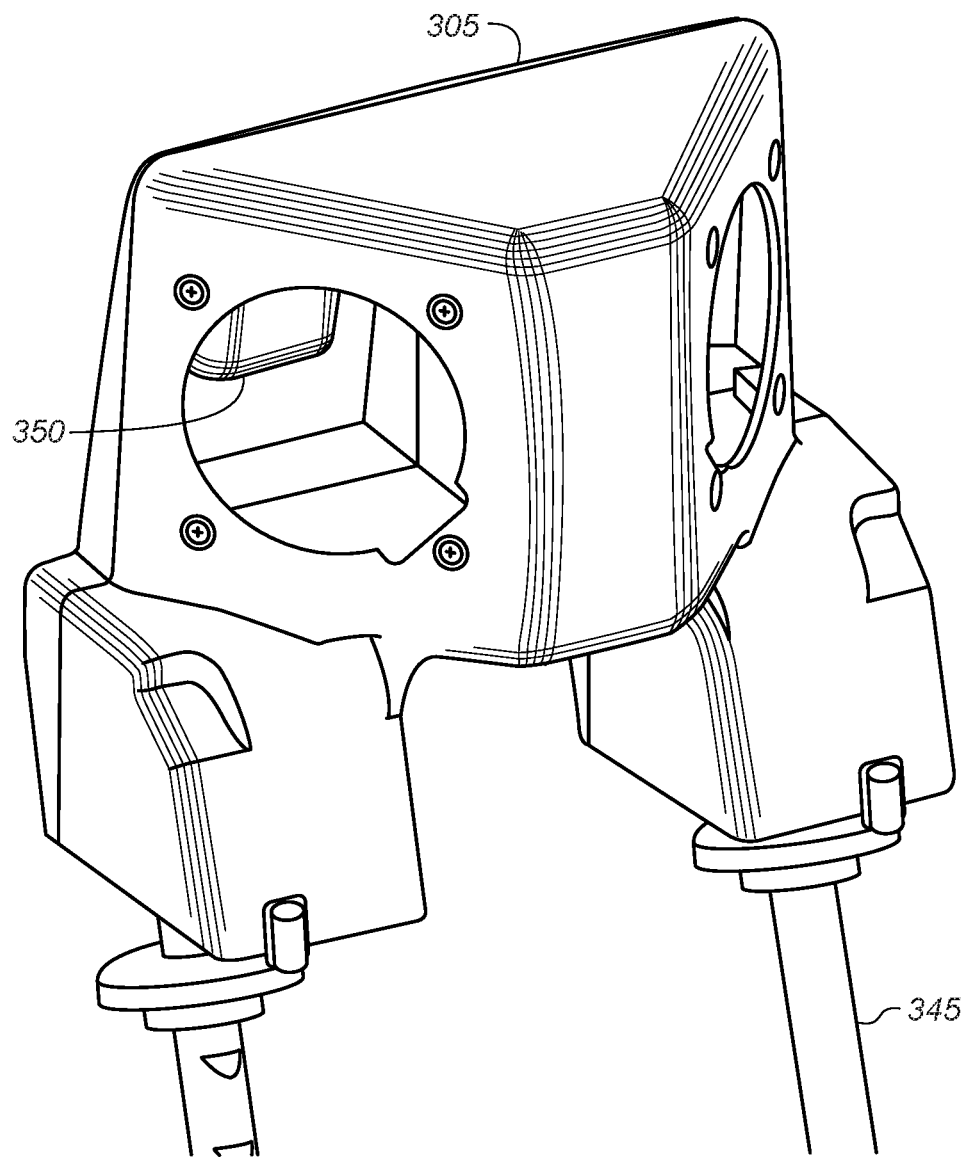
FIG. 3B shows an example of an acoustic enclosure that can be used in a headrest.
Figure 3C:
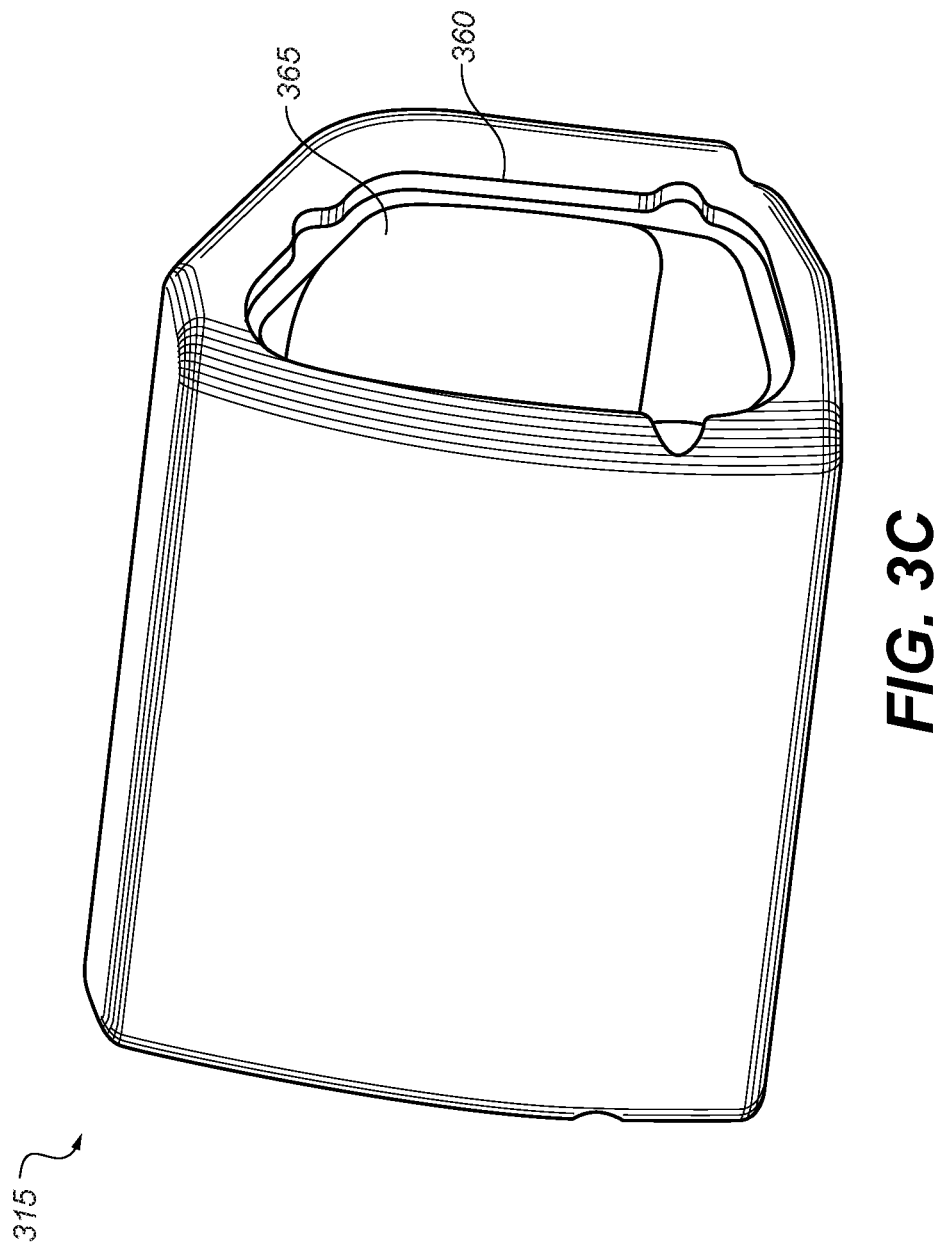
FIG. 3C shows an example of a rigid support in a headrest.

The grill 205 can be attached to a rigid support in various ways. FIGS. 3A-3C show various parts that can be used in particular implementations. Specifically, FIG. 3A shows a cross section of the headrest 200 depicted in FIGS. 2A and 2B. A housing 301 of the headrest 200 includes an acoustic enclosure 305 that supports the speakers 310a and 310b (310 in general). FIG. 3B shows an example of the acoustic enclosure 305. In some implementations, the acoustic enclosure 305 is supported by a frame 345 of the headrest. The acoustic enclosure 305 can include separate chambers for each of the speakers disposed within the acoustic enclosure. Each of the chambers include an opening 350 on the external surface of the acoustic enclosure 305 for accepting a speaker 310.

Referring again to FIG. 3A, the housing 301 of the headrest further includes a rigid portion or rigid support 315 disposed between the front wall of the housing 301 and the acoustic enclosure 305. The rigid support 315 can be composed of lightweight rigid material such as expanded resin, expanded polystyrene foam, or extruded polystyrene foam. The rigid support 315 can be configured to serve various purposes such as providing mechanical and structural stability to the headrest housing, providing a cushioning member between the front wall of the housing 301 and the acoustic enclosure 305, and providing acoustic isolation between the speakers within the housing 301.

In some implementations, the rigid support 315 can include an acoustic channel 320 disposed between a speaker 310 and the corresponding opening in the external surface of the housing 301. The acoustic channels can be configured for controlling a radiation pattern of the acoustic energy radiated from the speakers 310. In some implementations, the acoustic channels are configured to create a radiation pattern that increases the efficiency from left speaker to left ear and right speaker to right ear as compared to the left speaker to right ear and right speaker to left ear, respectively. In some implementations, as shown in FIG. 3A, a central axis 344 of the acoustic channel 320 does not coincide with a displacement axis 342 of the corresponding speaker diaphragm. For example, the central axis 344 of the acoustic channels 320 may diverge from the displacement axis 342 of the corresponding speaker diaphragm.

A perspective view of the rigid support 315 is shown in FIG. 3C. The rigid support 315 can be configured to be acoustically absorptive (or acoustically opaque) to inhibit acoustic energy from passing through. This can cause substantially all (e.g., at least 90%) of the acoustic energy that reaches a user to pass through the acoustic channels 320.

Figure 3D:
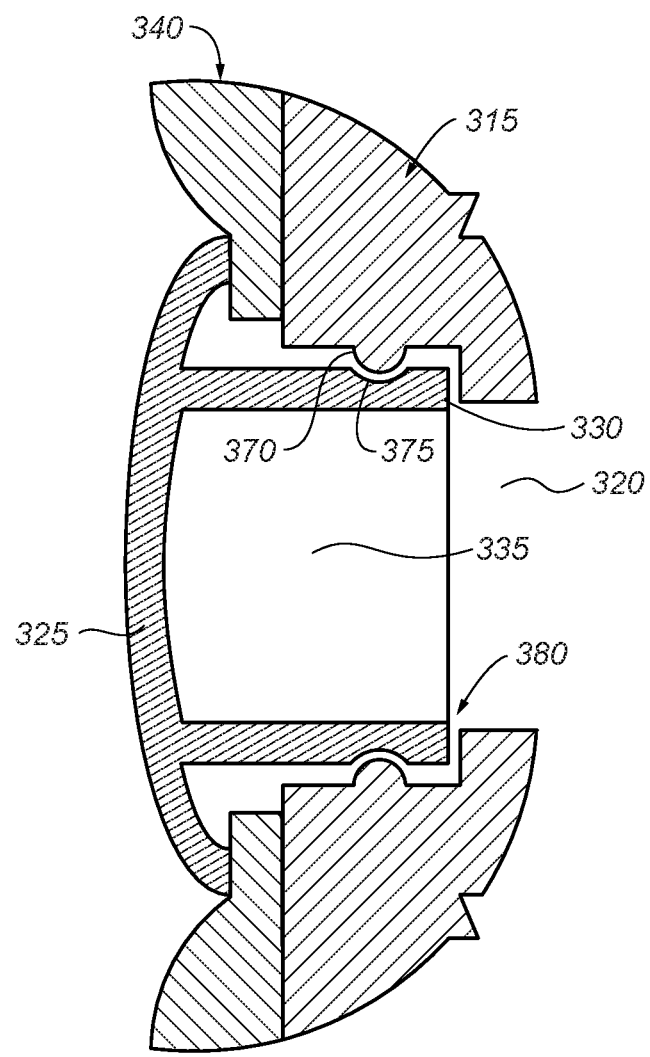
FIG. 3D shows another example of a grill that is attached to a rigid support.

Referring again to FIG. 3A, the speaker grill 205 is disposed over the external opening of the housing 301. In some implementations, the speaker grill 205 is configured to be attached to a portion of the rigid support 315. The grill 205 can include a base 325, and a sidewall 330 disposed in connection to the base 325. The base can include perforated patterns that allow acoustic energy from the corresponding speaker 310 to pass through the grill 205. The sidewall 330 can be disposed such that the sidewall forms a cavity 335 in conjunction with the base 325. The base 325 and the sidewall 330 can be implemented as a one piece structure that can be snapped-in to a rigid support. In some implementations, the sidewall can be curved such that the sidewall forms a beveled edge. In the example of FIG. 3A, the sidewall is curved outwards from the cavity 335 to form the beveled edge. In some implementations, the beveled edge, or another portion of the speaker grill 205 is configured to overlap with the outer layer 340 (e.g., soft foam, fabric or leather) of the headrest such that the speaker grill 205 holds the outer layer 340 in a tightly secured configuration against the housing 301. Such a tight configuration can improve the cosmetic appearance of the headrest, for example, by reducing a sagging of the outer layer 340. In some implementations, the cavity 335 and the acoustic channel 320 are located on opposing sides of the base 325. In other implementations, the cavity 335 and the acoustic channel 320 are located on the same side of the base 325. This is shown in the example of FIG. 3D.

The speaker grill 205 can include one or more structural features that facilitate a removable attachment with the rigid support 315. Such structural features can be disposed, for example, on the sidewall 330 or a portion of the base 325. In the example of FIG. 3A, the base 325 includes a projected portion 355 that attaches in a secure configuration with a corresponding receptacle or mating structure in the rigid support 315. For cases in which the projected portion 355 is disposed around the periphery of the base 325 (or on the sidewall 330), the corresponding receptacle or mating structure can include a recess disposed around the opening of the rigid support 315. This is illustrated in the example of FIG. 3C, where a channel or recess 360 is disposed around the periphery of the opening 365 of the rigid support 315 over which the speaker grill 205 is attached. In some implementations, the projected portion can be disposed on the rigid support 215, and correspondingly, the speaker grill 205 includes a recess or channel for attaching with the rigid support. This is shown in the example of FIG. 3D wherein the sidewall 330 includes a recessed portion 375 for accepting a projected portion 370 of the rigid support 315.

Various other types of structural features can be used for attaching the grill 205 to the rigid support 315. In some implementations, the structural features can include a separate toothed-rib that "bites" into the rigid support 315. In some implementations, the structural features include a layer of adhesive material used for attaching the grill to the rigid support 315. In some implementations, the rigid support 315 and the grill 205 can include multiple structural features for attaching to one another in a removable configuration. For example, and as shown in FIG. 3D, the rigid support 315 includes a recess 380 in addition to the projected portion 370 such that the grill 205 can be firmly snapped-in to attach to the rigid support 315.

Figure 4A:
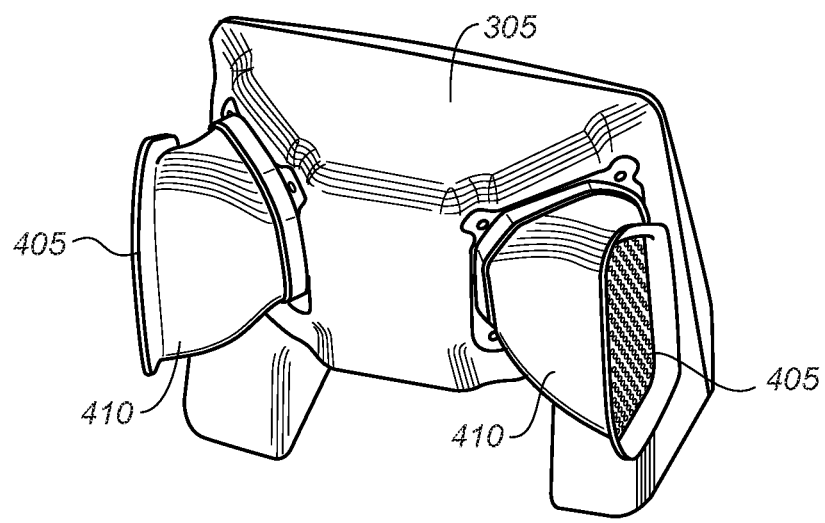
FIGS. 4A and 4B show examples of alternative internal configurations that can be used for the headrest of FIGS. 2A and 2B.
Figure 4B:
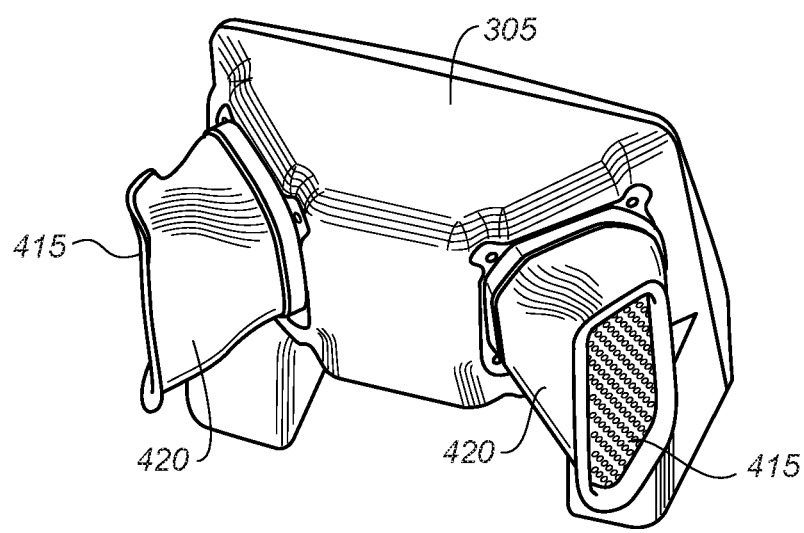

In some implementations, the grill can be attached to the acoustic enclosure 305, thereby using the acoustic enclosure 305 as a rigid portion to which the grill is attached. FIGS. 4A and 4B show examples of internal configurations that can be used for such arrangements. Specifically, FIGS. 4A and 4B show examples of grills 405 and 415, respectively, which are attached to the corresponding acoustic enclosures 305. In the example of FIG. 4A, the grill 405 is attached to the acoustic enclosure 305 by way of a connector piece 410 which may be disposed in the acoustic channel of the corresponding headrest 200. In the example of FIG. 4B, the grill 415 is attached to the acoustic enclosure 305 by way of a connector piece 420 which may be disposed in the acoustic channel of the headrest 200. The connector pieces 410 and 420 can be attached to the acoustic enclosure, for example, using fasteners such as screws, and the grills can be attached to the corresponding connector pieces 410, 420. In some implementations, the screws used for mounting a speaker to the acoustic enclosure 305 can also be used for attaching the acoustic channel.

The grills 405 and 415 can be attached to the corresponding connector pieces 410, 420 in various ways. In some implementations, the grills 405 and 415 can be removably attached to the corresponding connector pieces 410, 420 using one or more structural features described above with reference to FIGS. 3A-3D. The grills 405 and 415 may also be joined to the corresponding connector pieces 410, 420 using other mechanical attachment techniques such as slip fit overlap, welding, or glue in a groove, to name a few.

In some implementations, the connector piece 410 or 420 forms the acoustic channel for the corresponding speaker. Therefore, the connector pieces 410 and 420 may be used with or without the acoustic channel being integrated into a rigid support such as the rigid support 315 described above. FIGS. 4A and 4B illustrate two examples in which the shape of the grill and the connector pieces are different. Other shapes and sizes of the grill and the connector pieces are also possible, and can be configured based on various parameters including, for example, the shape of the housing in which the speakers are disposed, size and shape of the opening over which the grills are disposed, or characteristics of the acoustic channel.

Figure 5A:
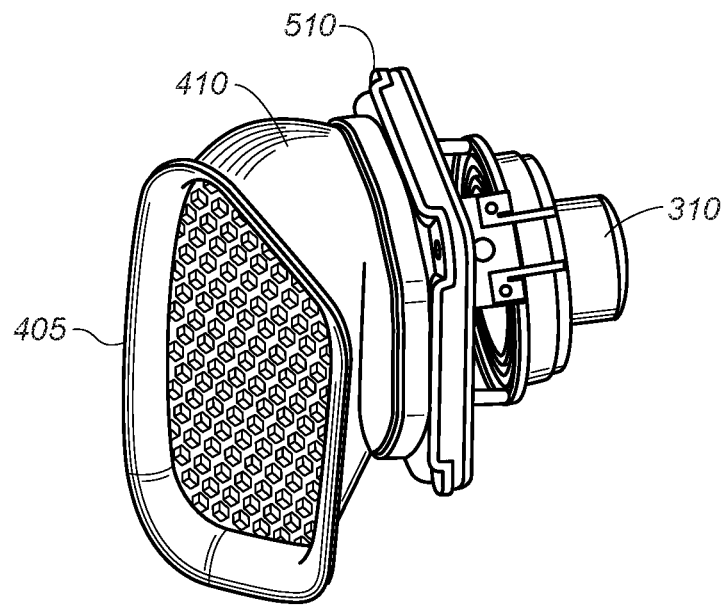
FIGS. 5A and 5B show additional details of the internal configuration of FIG. 4A.
Figure 5B:
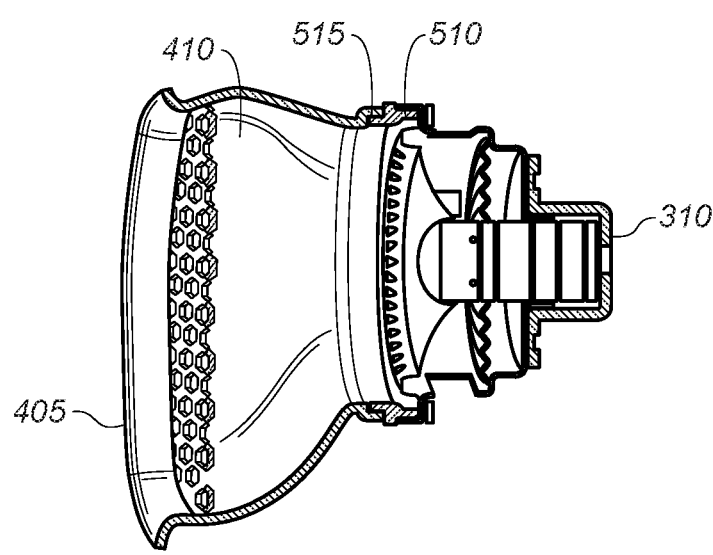

FIGS. 5A and 5B show additional details of the internal configuration depicted in FIG. 4A. As shown in FIG. 5A, in some implementations, the connector piece 410 can be attached to the acoustic enclosure 305 by attaching the connector piece to a speaker 310 mounted on the acoustic enclosure 305. This can be done, for example, using an interface plate 510 (also referred to as a pad ring) that is attached to the speaker 310 and configured to receive the connector piece 410 in an attaching configuration. As shown in FIG. 5B, the connector piece 410 can be attached to the interface plate 510, for example, using an interference fit configuration 515. In such a fit, the connector piece 410 and the interference plate 510 may be glued or welded to one another. Other attachment configurations can also be used. For example, the connector piece 410 can be connected to the interface plate 510 using a groove, or via a welding process. In some implementations, the interface plate 510 may be omitted, and the connector piece can be configured such that it can be directly attached to the speaker 310, for example, using fasteners such as screws.

Figure 6A:
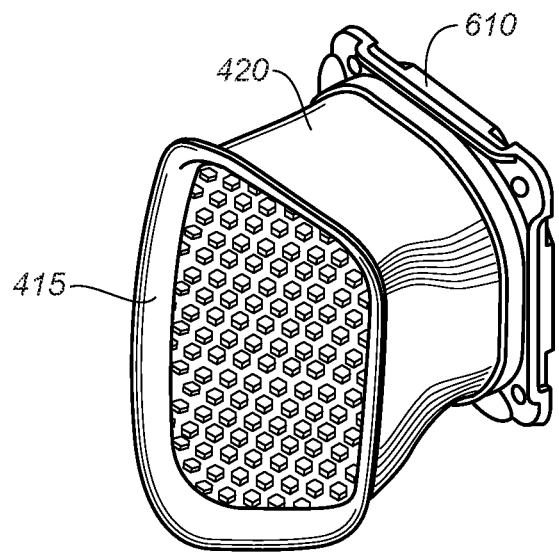
FIGS. 6A and 6B show additional details of the internal configuration of FIG. 4B.
Figure 6B:
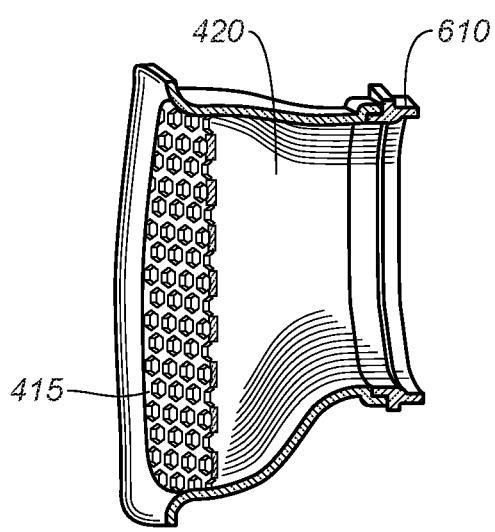

FIGS. 6A and 6B show additional details of the internal configuration depicted FIG. 4B. In this internal configuration, the arrangement and configuration of the different parts (e.g., the grill 415, the connector piece 420, and an interface plate 610) are substantially similar to the arrangement and configuration described with respect to FIGS. 5A and 5B. In some implementations, the interface plate 610 can be configured differently from the interface plate 510 to accommodate for the shape and size of the connector piece 420.

Figure 7A:
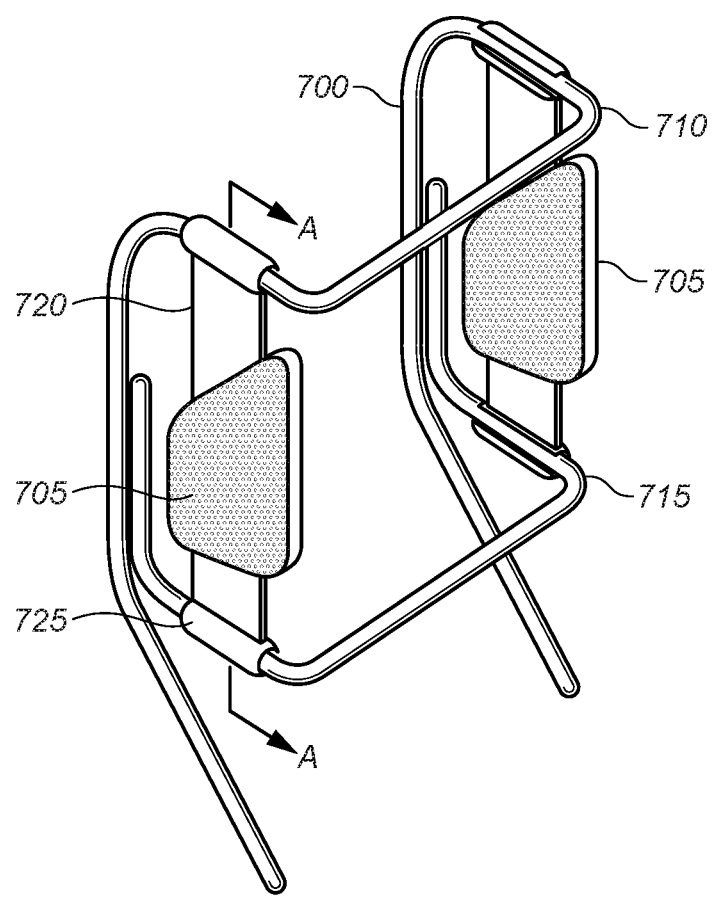
FIG. 7A-7D show configurations of another example of a headrest in which a grill is attached to a rigid support.

In some implementations, the grill can be attached to a frame of the seat or headrest, thereby using the frame as a rigid portion to which the grill is attached. This is illustrated in the example depicted in FIG. 7A, which shows a pair of grills 705 attached to either side of a frame 700 of a headrest. In this example, other parts of the speaker system, e.g., the acoustic enclosure, speakers, and acoustic channels, have not been shown to emphasize the attachment of the grills 705 to the frame 700. In some implementations, the frame 700 includes an upper portion 710 disposed towards the top of the headrest, and a lower portion 715 disposed closer to the bottom of the headrest than the upper portion 710. A grill 705 can be anchored or attached to the frame 700 using, for example, one or more connecting arms 720 that attach to the frame 700 using attachment portions 725.

Figure 7D:
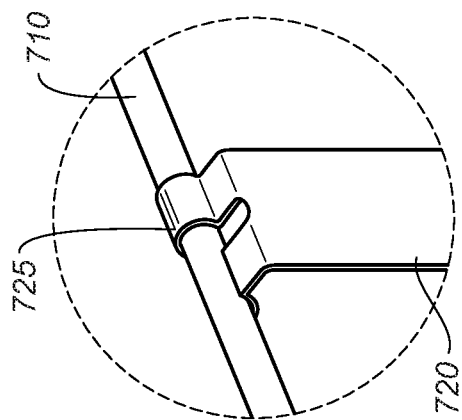
Figure 7C:
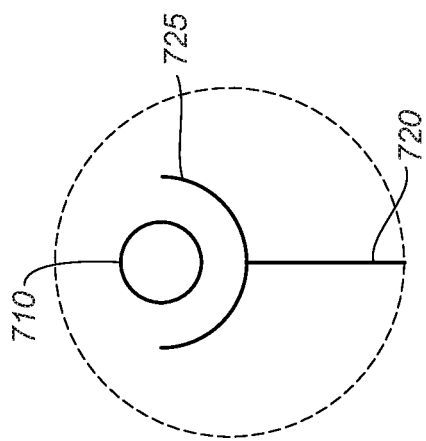
Figure 7B:
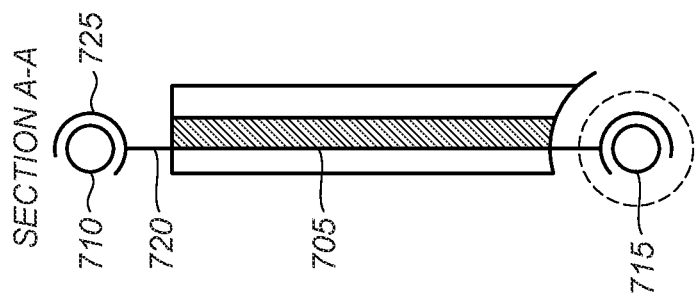

In some implementations, the grill 705 can be attached to both the upper portion 710 and the lower portion 715 of the frame using upper and lower connecting arms 720 that terminate in corresponding attachment portions 725. The attachment portions 725 can be configured to attach to the frame 700 in various ways. In some implementations, the attachment portion 725 is configured to clip on to the frame 700. For example, if the frame has a substantially circular cross-section, the attachment portion 725 can be configured to clip on to such a circular cross section. This is illustrated in FIG. 7B, which shows the attachment portion 725 as a substantially semicircular clip that clips on to the upper portion 710 and lower portion 715 of the frame 700.

The attachment portion 725 can be of various types. In the example of FIG. 7B, the attachment portion 725 is anchored or attached to the connecting arm 720 towards one end of the substantially semi-circular arc formed by the cross-section of the attachment portion. FIG. 7C shows another variant of the attachment portion 725 in which the attachment portion is anchored or attached to the connecting arm 720 at or near a midpoint of the substantially semi-circular arc formed by the cross-section the attachment portion. FIG. 7D shows yet another variant in which the connecting arm 720 terminates in an attachment portion 725 that includes two separate branches or fingers that contact the upper portion 710 (or the lower portion 715) of the frame 700 at different points.

The technology described in this document allows for implementing aesthetically appealing and customizable speaker grills, headrests, or other acoustically enabled seats and furniture. By providing various techniques for attaching a speaker grill to a rigid portion of the seat/headrest, the technology is compatible with various types of headrests and vehicle seats.

A number of implementations have been described. However, other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. An apparatus configured to be attached to a speaker system disposed in a portion of a vehicle seat, the apparatus comprising:
a speaker cover comprising a perforated surface configured to pass acoustic energy radiated from the front of the speaker system, and a sidewall extending from the perforated surface; and a structural feature configured to allow the speaker cover to be attached to a substantially rigid portion of the vehicle seat, and to be removed from the substantially rigid portion of the vehicle seat following attachment, the substantially rigid portion comprising a connector piece disposed in an acoustic channel of the speaker system, the connector piece being attached to an acoustic enclosure of the speaker system, and configured to direct acoustic energy radiated from the front of the speaker system towards the speaker cover.

2. The speaker cover of claim 1, wherein the sidewall is curved such that the sidewall forms a beveled edge.

3. The speaker cover of claim 2, wherein at least a portion of the beveled edge overlaps an external layer of the vehicle seat when the speaker cover is attached to the substantially rigid portion.

4. The speaker cover of claim 1, wherein the substantially rigid portion comprises a material selected from the group consisting of: expanded resin, metal, and plastic.

5. The speaker cover of claim 1, wherein the substantially rigid portion comprises a frame of the seat.

6. The speaker cover of claim 1, wherein the portion of the vehicle seat comprises a headrest.

7. The speaker cover of claim 1, wherein the structural feature is disposed on the sidewall.

8. The speaker cover of claim 1, wherein the structural feature comprises a recessed portion configured to attach in a mating configuration with a projected portion in the substantially rigid portion of the vehicle seat.

9. The speaker cover of claim 1, wherein the structural feature comprises a projected portion configured to attach in a mating configuration with a recessed portion in the substantially rigid portion of the vehicle seat.

10. The speaker cover of claim 1, wherein a portion of the sidewall overlaps with an external layer of the vehicle seat when the speaker cover is attached to the substantially rigid portion.

11. A seat headrest comprising:
a housing arranged to support at least a portion of the head of a user, the housing comprising at least one speaker and an acoustic enclosure, and configured to support an acoustic channel for radiating acoustic energy from the front of the speaker; and
a speaker cover configured to be attached to the housing, the speaker covers comprising:
a perforated surface configured to pass the acoustic energy from the acoustic channel to an exterior of the headrest,
a sidewall extending from the perforated surface, and
a structural feature configured to allow the speaker cover to be attached to a substantially rigid portion of the housing, and to be removed from the substantially rigid portion of the housing following attachment, the substantially rigid portion comprising a connector piece disposed in the acoustic channel, the connector piece being attached to an acoustic enclosure of the speaker, and configured to pass acoustic energy radiated from the front of the speaker towards the speaker cover.

12. The headrest of claim 11, wherein the substantially rigid portion comprises a material selected from the group consisting of: expanded resin, metal, and plastic.

13. The headrest of claim 11, wherein the substantially rigid portion comprises a first frame portion disposed on one side of the housing, and a second frame portion disposed on another, opposing side of the housing.

14. The headrest of claim 11, wherein the substantially rigid portion comprises an acoustic channel disposed in the housing.

15. The headrest of claim 11, wherein the sidewall overlaps an external layer of the headrest when the speaker cover is attached to the substantially rigid portion.

16. The headrest of claim 11, wherein the structural feature is disposed on the sidewall.

17. The headrest of claim 11, wherein the structural feature comprises a recessed portion configured to attach in a mating configuration with a projected portion in the substantially rigid portion of the housing.

18. The headrest of claim 11, wherein the structural feature comprises a projected portion configured to attach in a mating configuration with a recessed portion in the substantially rigid portion of the headrest.

19. The headrest of claim 11, wherein a portion of the sidewall overlaps with an external layer of the headrest when the speaker cover is attached to the substantially rigid portion of the housing.

* * * * *